United States Patent
Kumar et al.

(10) Patent No.: US 11,084,170 B2
(45) Date of Patent: Aug. 10, 2021

(54) COLLABORATIVE ROBOT AND A METHOD FOR PROTECTING COLLABORATIVE ROBOT FROM HAZARDOUS EVENTS

(71) Applicant: WIPRO LIMITED, Bangalore (IN)

(72) Inventors: Vijay Kumar, Bangalore (IN); Thomas Chittakattu Ninan, Kannur (IN); Shagun Rai, Allahabad (IN)

(73) Assignee: Wipro Limited, Bangalore (IN)

(*) Notice: Subject to any disclaimer, the term of this patent is extended or adjusted under 35 U.S.C. 154(b) by 525 days.

(21) Appl. No.: 15/938,926

(22) Filed: Mar. 28, 2018

(65) Prior Publication Data

US 2019/0299411 A1    Oct. 3, 2019

(30) Foreign Application Priority Data

Mar. 27, 2018  (IN) .............................. 201841011320

(51) Int. Cl.
*B25J 9/16* (2006.01)

(52) U.S. Cl.
CPC ........... *B25J 9/1676* (2013.01); *B25J 9/1682* (2013.01); *B25J 9/1697* (2013.01)

(58) Field of Classification Search
CPC ...... B25J 9/1676; B25J 9/1697; B25J 9/1682; G05B 2219/40199
See application file for complete search history.

(56) References Cited

U.S. PATENT DOCUMENTS

| | | | |
|---|---|---|---|
| 5,445,235 A | * | 8/1995 | Gomi ................... B25J 19/0075 180/8.1 |
| 2014/0085092 A1 | | 3/2014 | Fadell et al. |
| 2017/0225334 A1 | | 8/2017 | Deyle et al. |
| 2018/0178377 A1 | * | 6/2018 | Yang ...................... B25J 13/08 |

FOREIGN PATENT DOCUMENTS

| | | |
|---|---|---|
| CN | 2889642 | 4/2007 |
| CN | 201088794 | 7/2008 |

\* cited by examiner

*Primary Examiner* — Basil T. Jos
(74) *Attorney, Agent, or Firm* — Finnegan, Henderson, Farabow, Garrett & Dunner, LLP (57) ABSTRACT

Disclosed herein is a collaborative robot and a method for protecting collaborative form hazardous events. The method comprises detecting hazardous event in a working environment of the collaborative robot. Thereafter, the detected hazardous event is validated. Once the validation is performed, the inflation of a protective fabric housed in a protective compartment of the collaborative robot is initiated, wherein upon inflation, the protective fabric covers the collaborative robot for protecting the collaborative robot from the hazardous event. The present invention is used for self-protection of the collaborative robot in hazardous events without any human intervention.

13 Claims, 5 Drawing Sheets

COLLABORATIVE ROBOT AND A METHOD FOR PROTECTING COLLABORATIVE ROBOT FROM HAZARDOUS EVENTS

TECHNICAL FIELD

The present subject matter is generally related to collaborative robots and more particularly, but not exclusively, to a collaborative robot and a method for protecting collaborative robot from hazardous events.

BACKGROUND

Collaborative robots [also referred as co-bots] are machines intended to physically interact with humans in a shared workspace/environment to automate certain operations. Since co-bots are intended towards efficiency and speed improvements while working alongside humans, it is also imperative for the co-bots to act accordingly in case of hazardous events. The hazardous events may be fire accidents, collision or any other emergencies in a work place.

Since the main functionality of the co-bot is helping humans by automation and not rescuing humans, they are also vulnerable to the hazardous events same as the humans working in the workspace.

Most of the existing co-bots are used as fire rescue robots to rescue victims from fire. Some other co-bots are used to detect policy violations at a work place/environment and some other co-bots are used for building a smart security system. However, the existing techniques have failed to provide a protection mechanism for protecting the co-bots from the hazardous events since even the co-bots are vulnerable to the hazardous events.

SUMMARY

Disclosed herein is a collaborative robot. The collaborative robot comprises an event detection unit configured to detect a hazardous event in a working environment of the collaborative robot. The collaborative robot also comprises a protective compartment housing a protective fabric. The collaborative robot further comprises a control unit communicatively connected to the event detection unit and the protective compartment, wherein the control unit is configured to validate detection of the hazardous event and initiate inflation of the protective fabric upon validating the detection of the hazardous event. Upon inflation of the protective fabric, the protective fabric covers the collaborative robot for protecting the collaborative robot from the hazardous event.

Further, the present disclosure relates to a method for protecting a collaborative robot from hazardous event. The method comprises detecting, by an event detection unit configured in the collaborative robot, the hazardous event in a working environment of the collaborative robot. Once the hazardous event is detected, the method comprises validating detection of the hazardous event. The validation is performed by a control unit configured in the collaborative robot. Once the validation is performed, the method comprises initiating inflation of a protective fabric housed in a protective compartment of the collaborative robot, wherein upon inflation, the protective fabric covers the collaborative robot for protecting the collaborative robot from the hazardous event.

Furthermore, the present disclosure comprises a non-transitory computer readable medium including instructions stored thereon that when processed by a control unit, configured in a collaborative robot, causes the collaborative robot to perform operations comprising detecting the hazardous event in a working environment of the collaborative robot. Once the hazardous event is detected, the instructions cause the control unit to validate detection of the hazardous event. Once the validation is performed, the instructions cause the control unit to initiate inflation of a protective fabric housed in a protective compartment of the collaborative robot. Upon inflation, the protective fabric covers the collaborative robot for protecting the collaborative robot from the hazardous event.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a collaborative robot (co-bot) and a method of protecting the co-bot from a hazardous event. The hazardous event may include, but not limited to, fire accidents and collision detection. The co-bot may comprise an event detection unit, a protective compartment and a control unit. The event detection unit may comprise one or more sensors. The one or more sensors may be a microphone, a Light Detection and Ranging [LIDAR] and image capturing units. The image capturing units may include, but not limited to, a Red Green Blue (RGB) camera and an Infrared (IR) camera. The event detection unit may be configured to detect hazardous event in a working environment of the co-bot. Once the event detection unit detects any hazardous event, the control unit may validate the detected hazardous event. The control unit may validate the detected hazardous event when two or more sensors configured in the co-bot detect the same hazardous event. For example, if the hazardous event is a fire accident, the microphone configured in the co-bot may detect the hazardous event, "fire accident" when a fire alarm sound is captured by the microphone. The RGB camera configured in the co-bot may also capture images of fire accident in the working environment of the co-bot. Since both the sensors detect the same hazardous event, the control unit may validate the hazardous event. Thereafter, the control unit may initiate inflation of a protective fabric housed in a protective compartment of the co-bot. When the protective fabric is inflated, the protective fabric covers the co-bot for protecting the co-bot from the hazardous event. Therefore, the present invention provides a mechanism for automatically protecting the co-bot from the hazardous event without any human intervention.

In the following detailed description of the embodiments of the disclosure, reference is made to the accompanying drawings that form a part hereof, and in which are shown by way of illustration of embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
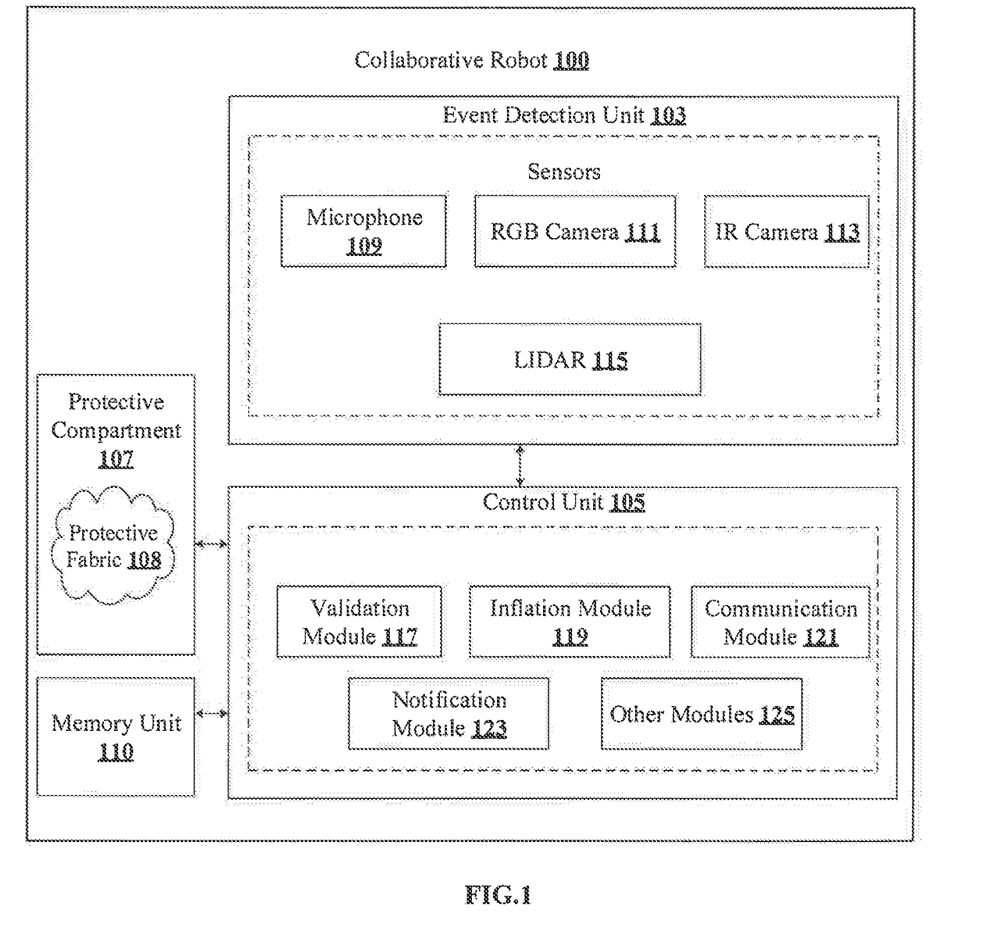
FIG. 1 shows a detailed block diagram illustrating a collaborative robot in accordance with some embodiments of the present disclosure.

FIG. 1 shows a detailed block diagram of a collaborative robot in accordance with some embodiments of the present disclosure.

The collaborative robot (co-bot) 100 may include an event detection unit 103, a control unit 105 and a protective compartment 107. The event detection unit 103 may include one or more sensors. The one or more sensors may include, but not limited to, a microphone 109, a Red Green Blue (RGB) camera 111, Infrared (IR) camera 113 and a Light Detection and Ranging (LIDAR) 115. The event detection unit 103 may be configured to detect a hazardous event. The hazardous event may include, but not limited to, a fire accident and a collision detection. As an example, the microphone 109 may capture an event in a working environment of the co-bot 100 when a fire alarm sound is detected and may provide information regarding the event to the control unit 105 for validation of the hazardous event. The RGB camera 111 may be used to capture images in the working environment of the co-bot 100 to detect a hazardous event. As an example, the RGB camera 111 may detect the hazardous event "fire accident" in the working environment of the co-bot 100, if the RGB camera 111 captures images of fire/flames. Similarly, the IR camera 113 may be used to detect the hazardous event such as "fire accident" in the working environment of the co-bot 100, if the IR camera 113 detects IR rays emitted from the fire which indicates the presence of fire in the working environment of the co-bot 100. Further, the LIDAR 115 may be used to detect the hazardous event such as "collision". The LIDAR 115 may be used to detect one or more objects approaching towards the co-bot 100 and the distance of the one or more objects based on which the hazardous event "collision" may be detected.

In an embodiment, once the hazardous event is detected by the event detection unit 103, the event detection unit 103 may provide information regarding the detected event to the control unit 105. Thereafter, the control unit 105 may match the detected event with one or more predefined hazardous event patterns stored in a memory unit 110 associated with the control unit 105. The control unit 105 may detect the event as the hazardous event when the detected event matches with one or more predefined hazardous event patterns.

The control unit 105 may comprise a validation module 117, an inflation module 119, a communication module 121, a notification module 123 and other modules 125. In one implementation, the one or more modules may be stored as a part of the control unit 105. In another implementation, the one or more modules may be communicatively coupled to the control unit 105 for performing one or more functions of the co-bot 100.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. In an embodiment, the other modules 125 may be used to perform various miscellaneous functionalities of the co-bot 100. It will be appreciated that such modules may be represented as a single module or a combination of different modules. Furthermore, a person of ordinary skill in the art will appreciate that in an implementation, the one or more modules may be stored in the memory 110, without limiting the scope of the disclosure.

In an embodiment, the validation module 117 may be configured to validate the detected hazardous event. The validation module 117 may validate the detected hazardous event when two or more sensors detect the same hazardous event. As an example, the microphone 109 may capture the fire alarm sound in the working environment of the co-bot 100 and may provide information regarding the fire alarm sound to the control unit 105. The control unit 105 may also receive captured images from the RGB camera 111 configured in the co-bot 100, which indicates presence of fire in the working environment of the co-bot 100. Since two sensors, i.e. microphone 109 and the RGB camera 111 have captured the same event "fire", the validation module 117 may validate the hazardous event.

Figure 2A:
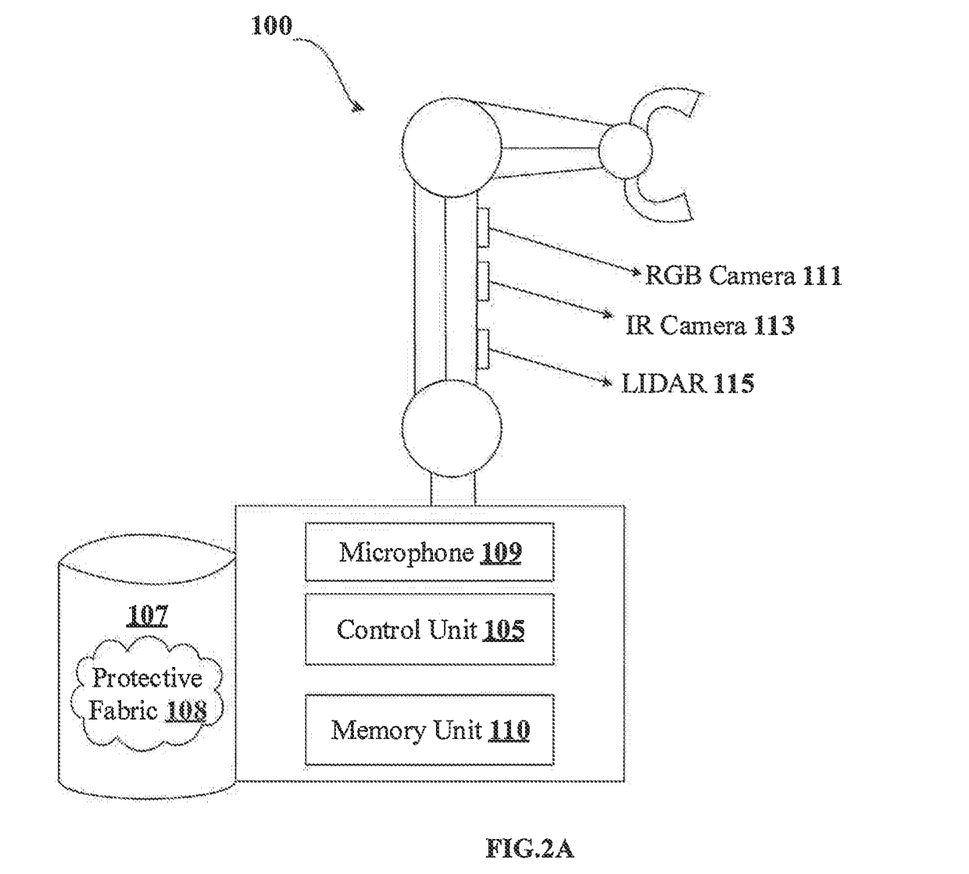
FIG. 2A shows exemplary representation of a collaborative robot in accordance with some embodiments of the present disclosure.

In an embodiment, the protective compartment 107 may be configured in the co-bot 100 to house a protective fabric 108. The protective compartment 107 may be fire resistant and collision resistant i.e. the protective compartment 107 may be made of materials which are fire resistant and collision resistant. As an example, the protective fabric 108 may be made of materials such as Marko fabric or Marlan fabric for providing fire resistance. The protective fabric 108 housed in the protective compartment 107 may also be fire resistant and collision resistant. The protective fabric 108 may be of a predefined size and the size of the protective fabric 108 may depend on size of the co-bot 100. An exemplary representation of the co-bot 100 with protective compartment is shown in FIG. 2A.

Figure 2B:
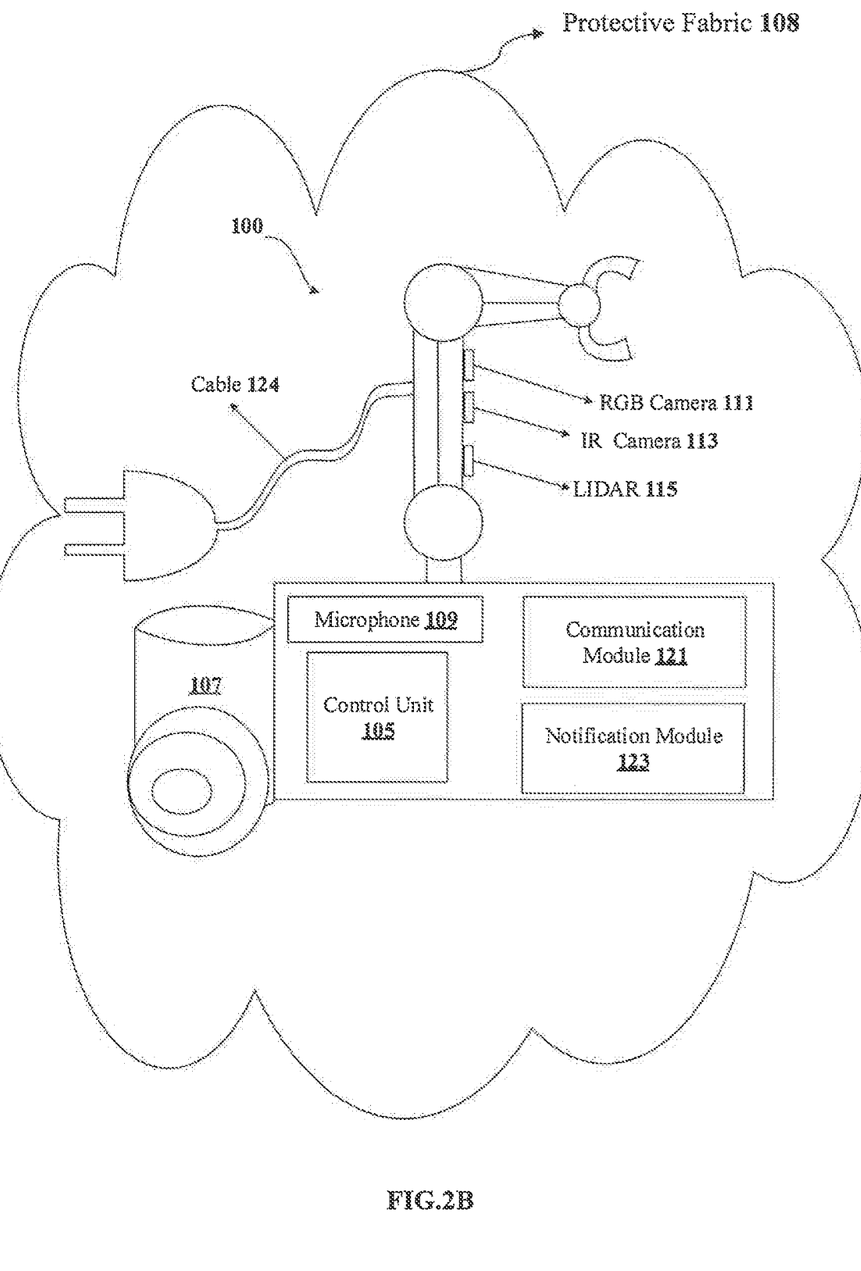
FIG. 2B shows exemplary representation of inflation of protective fabric for protecting a collaborative robot from hazardous event in accordance with some embodiments of the present disclosure.

In an embodiment, the inflation module 119 may be configured to inflate the protective fabric 108 upon validation of the hazardous event. The inflation module 119 may activate an inflation mechanism which is similar to air-bag inflation mechanism, upon which the protective fabric 108 stored in the protective compartment 107 may be inflated such that the protective fabric 108 covers the co-bot 100 completely for protecting the co-bot 100 from the hazardous event as shown in FIG. 2B. Further, prior to inflation of the protective fabric 108, one or more cables 124 attached to the co-bot 100 may be detached from the co-bot 100 so that the movement of the co-bot 100 is prohibited.

The communication module 121 may be configured to establish communication means for the co-bot 100 to communicate with one or more other computing devices. The notification module 123 may be configured to generate a notification alert upon inflation of the protective fabric 108. The generated notification alert may be communicated through the communication module 121 to the one or more computing devices for remotely monitoring the co-bot 100 and to take necessary actions.

In an embodiment, the co-bot 100 may include a battery module (not shown in figures). The battery module may provide power to various components of the co-bot 100, including the protective compartment 107 and the control unit 105, when the one or more cables 124 attached to the co-bot 100 are detached post detection of the hazardous event.

Figure 3:
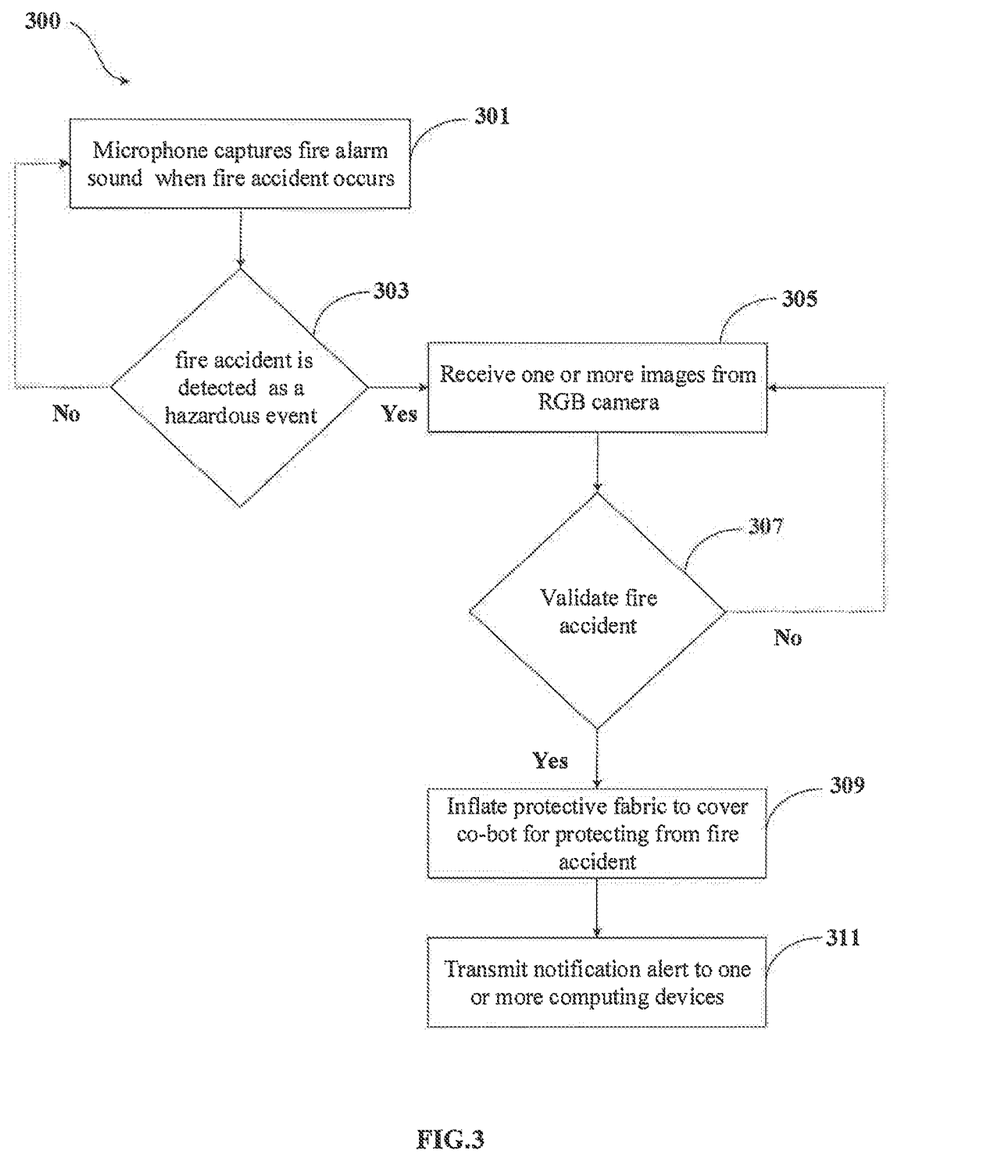
FIG. 3 shows a flowchart illustrating exemplary workflow for protecting a collaborative robot from hazardous event in accordance with some embodiments of the present disclosure.

FIG. 3 shows a flowchart illustrating exemplary workflow for protecting a collaborative robot from hazardous event in accordance with some embodiments of the present disclosure.

As an example, consider the working environment of the co-bot 100 to be a production line of a building, where the co-bot 100 is being operated and a fire accident occurs. The fire alarm system in the building detects the event "fire accident" and produce the fire alarm. At block 301, the microphone 109 configured in the co-bot 100 captures the fire alarm sound and transmits a signal to the control unit 105. At block 303, the control unit 105 determines whether the event captured by the microphone 109 is a hazardous event or not. If the control unit 105 determines the event as the hazardous event, the method proceeds to block 305. If the control unit 105 determines that the event is not a hazardous event, then the method proceeds back to block 301. The control unit 105 determines the event as hazardous event since the event matches with one or more predefined hazardous event patterns stored in a memory unit 110 of the co-bot 100. Thereafter, the control unit 105 validates the hazardous event i.e. checks if the fire accident has actually occurred. To perform validation, at block 305, the control unit 105 receives one or more images from RGB camera 111. The one or more images indicates presence of fire in the working environment. Therefore, the method proceeds to block 307.

At block 307, the control unit 105 validates the detected fire accident as the hazardous event. In this scenario, the microphone 109 has detected the hazardous event "fire accident". The RGB camera 111 configured in the co-bot 100 also detects the hazardous event "fire accident" in the working environment of the co-bot 100 based on the one or more images captured by the RGB camera 111. Since both the sensors i.e. the microphone 109 and the RGB camera 111 have detected the same event "fire accident", the control unit 105 validate the hazardous event and proceeds to block 309. If the one or more images does not indicate the presence of fire in the working environment, then the method proceeds back to block 305 which indicates that the fire alarm sound may be a false alarm and hence signals the RGB camera 111 to capture one or more images again to verify if the fire accident has actually occurred. Alternatively, the control unit 105 may also signal the IR camera to capture the one or more images using which the control unit 105 would verify the occurrence of fire accident.

At block 309, the control unit 105 initiates inflation of the protective fabric 108 from the protective compartment 107 using an inflation mechanism such as air bag inflation systems in vehicles. As an example, pressurized air or spring mechanisms may be used for inflating the protective fabric 108. Once the protective fabric 108 is inflated, the protective fabric 108 covers the co-bot 100 as shown in FIG. 2B for protecting the co-bot 100 from the hazardous event "fire accident". At block 311, the control unit 105 generates a notification alert and communicates the notification alert to one or more computing devices or one or more individuals remotely monitoring the co-bot 100 to take necessary actions.

In another example, consider the working environment of the co-bot 100 to be a production line of a building, where the co-bot 100 is being operated and the LIDAR 115 detects an object approaching towards the co-bot 100 such as another co-bot. The LIDAR 115 measures the distance between the object and the co-bot 100. If the distance is exceeding a predefined threshold, the LIDAR 115 detects the event as "collision". The control unit 105 validates the event as the hazardous since the event matches with an event detected using an RGB camera 111 as the RGB camera may also indicate the object approaching towards the co-bot 100. Based on the validation, the control unit 105 initiates inflation of the protective fabric 108 stored in the protective compartment 107. Upon inflation, the protective fabric 108 covers the co-bot 100 thereby protecting from colliding with the object.

Figure 4:
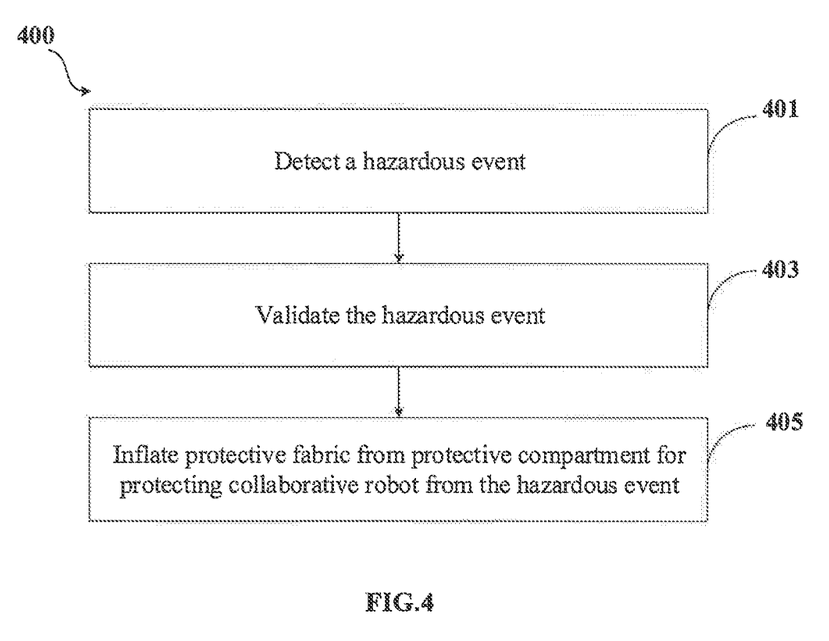
FIG. 4 shows a flowchart illustrating a method of protecting collaborative robot from hazardous event in accordance with some embodiments of the present disclosure.

FIG. 4 shows a flowchart illustrating a method of protecting collaborative robot from hazardous event in accordance with some embodiments of the present disclosure.

As illustrated in FIG. 4, the method 400 includes one or more blocks illustrating a method of protecting collaborative robot (co-bot) 100 from hazardous event. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the method includes detecting a hazardous event in a working environment of the co-bot 100. The hazardous event may be detected using an event detection unit 103 configured in the co-bot 100. The event detection unit 103 may include one or more sensors such as a microphone 109, RGB camera 111, IR camera 113 and LIDAR 115.

At block 403, the method includes, validating the detected hazardous event. Once the event detection unit 103 detects the hazardous event, the event detection unit 103 may provide information regarding the detected event to the control unit 105. The control unit 105 may validate the detected hazardous event when two or more sensors detects the same hazardous event. For example, the microphone 109 may detect the hazardous event "fire accident" based on fire alarm sound. Similarly, the IR camera 113 may detect the hazardous event "fire accident" when the IR rays are reflected from fire in the working environment of the co-bot 100. Since both the sensors, i.e. the microphone 109 and the IR camera 113 have detected the same event i.e. "fire accident", the control unit 105 may validate the hazardous event "fire accident".

At block 405, the method includes, initiating inflation of a protective fabric 108 to protect the co-bot 100 from the hazardous event. Once the control unit 105 validates the hazardous event, the control unit 105 may initiate inflation of the protective fabric 108 stored in a protective compartment 107 of the co-bot 100. The protective fabric 108 and the protective compartment 107 may be made of fire proof and fire resistant materials and the protective fabric 108 may be of a predefined size. The inflated protective fabric 108 may cover the co-bot 100 for protecting the co-bot 100 from the hazardous event.

In an embodiment, prior to inflation of the protective fabric 108, the one or more cables 124 attached with the co-bot 100 may be detached by the co-bot 100, thereby prohibiting movement of the co-bot 100. Further, upon inflation, the co-bot 100 may shrink/re-size and accommodate in a predefined design limit of the protective fabric 108. Thereafter, the control unit 105 may generate a notification alert and communicate the notification alert to one or more computing devices or one or more individuals remotely monitoring the co-bot 100 to take necessary actions.

Advantages of the embodiment of the present disclosure are illustrated herein.

In an embodiment, the present disclosure a collaborative robot and a method for protecting the collaborative robot for hazardous event such as fire accidents and collision.

In an embodiment, the method of present disclosure enables the collaborative robot to protect itself from hazardous event using a protective fabric.

In an embodiment, the collaborative robot protects itself from hazardous events without any human intervention.

In an embodiment, since the collaborative robot is protected from hazardous event, the damage to the collaborative robot is avoided thereby decreasing the rate of replacement of the collaborative robot and hence providing an economical solution.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Collaborative Robot [co-bot] |
| 103 | Event Detection Unit |
| 105 | Control Unit |
| 107 | Protective Compartment |
| 108 | Protective Fabric |
| 109 | Microphone |
| 110 | Memory Unit |
| 111 | RGB Camera |
| 113 | IR Camera |
| 115 | LIDAR |
| 117 | Validation Module |
| 119 | Inflation Module |
| 121 | Communication Module |

-continued

| Reference Number | Description |
| --- | --- |
| 123 | Notification Module |
| 124 | One or more cables [cable] |
| 125 | Other Modules |

What is claimed is:

1. A collaborative robot comprising:
a microphone to detect an audible fire alarm;
one or more cameras to visually detect a fire;
a protective compartment housing a protective fabric, wherein the protective compartment and the protective fabric are fire resistant; and
a control unit communicatively connected to the microphone, the one or more cameras, and the protective compartment, the control unit is configured to:
validate detection of a fire event based on the microphone detecting an audible fire alarm and the one or more cameras visually detecting a fire; and
initiate inflation of the protective fabric upon validating the detection of the fire event, wherein upon inflation, the protective fabric covers the collaborative robot for protecting the collaborative robot from the fire event.

2. The collaborative robot as claimed in claim 1, further comprising a Light Detection and Ranging [LIDAR] sensor.

3. The collaborative robot as claimed in claim 1, wherein the one or more cameras comprises at least a Red Green Blue (RGB) camera or an Infrared (IR) Camera.

4. The collaborative robot as claimed in claim 1, wherein the control unit detects the fire event based on one or more predefined hazardous event patterns stored in a memory unit of the collaborative robot.

5. The collaborative robot as claimed in claim 1 detaches from one or more cables attached with the collaborative robot prior to inflation of the protective fabric.

6. The collaborative robot as claimed in claim 1 generates a notification alert upon inflating the protective fabric.

7. A method of protecting a collaborative robot from a fire event, the method comprising:
detecting, by a microphone, an audible fire alarm;
detecting visually, by one or more cameras, a fire;
validating, by a control unit configured in the collaborative robot, a fire event based on the microphone detecting an audible fire alarm and the one or more cameras visually detecting a fire; and
initiating, by the control unit, inflation of a protective fabric housed in a protective compartment of the collaborative robot upon validating the detection of the fire event, wherein upon inflation, the protective fabric covers the collaborative robot for protecting the collaborative robot from the fire event, wherein the protective compartment and the protective fabric are fire resistant.

8. The method as claimed in claim 7, further comprising a Light Detection and Ranging [LIDAR] sensor.

9. The method as claimed in claim 7, wherein the one or more cameras comprises at least a Red Green Blue (RGB) camera or an Infrared (IR) Camera.

10. The method as claimed in claim 7, wherein the fire event is detected by the control unit based on one or more predefined hazardous event patterns stored in a memory unit of the collaborative robot.

11. The method as claimed in claim 7 further comprises detaching one or more cables attached with the collaborative robot prior to inflation of the protective fabric.

12. The method as claimed in claim 7 further comprises generating a notification alert upon inflating the protective fabric.

13. A non-transitory computer readable medium including instructions stored thereon that when processed by a control unit, configured in a collaborative robot, cause the collaborative robot to perform operations comprising:
detecting an audible fire alarm from a microphone;
detecting, visually, a fire from one or more cameras;
validating detection of a fire event based on the microphone detecting an audible fire alarm and the one or more cameras visually detecting a fire; and
initiating inflation of a protective fabric housed in a protective compartment of the collaborative robot upon validating the detection of the fire event, wherein upon inflation, the protective fabric covers the collaborative robot for protecting the collaborative robot from the fire event.

* * * * *